United States Patent Office 2,980,949
Patented Apr. 25, 1961

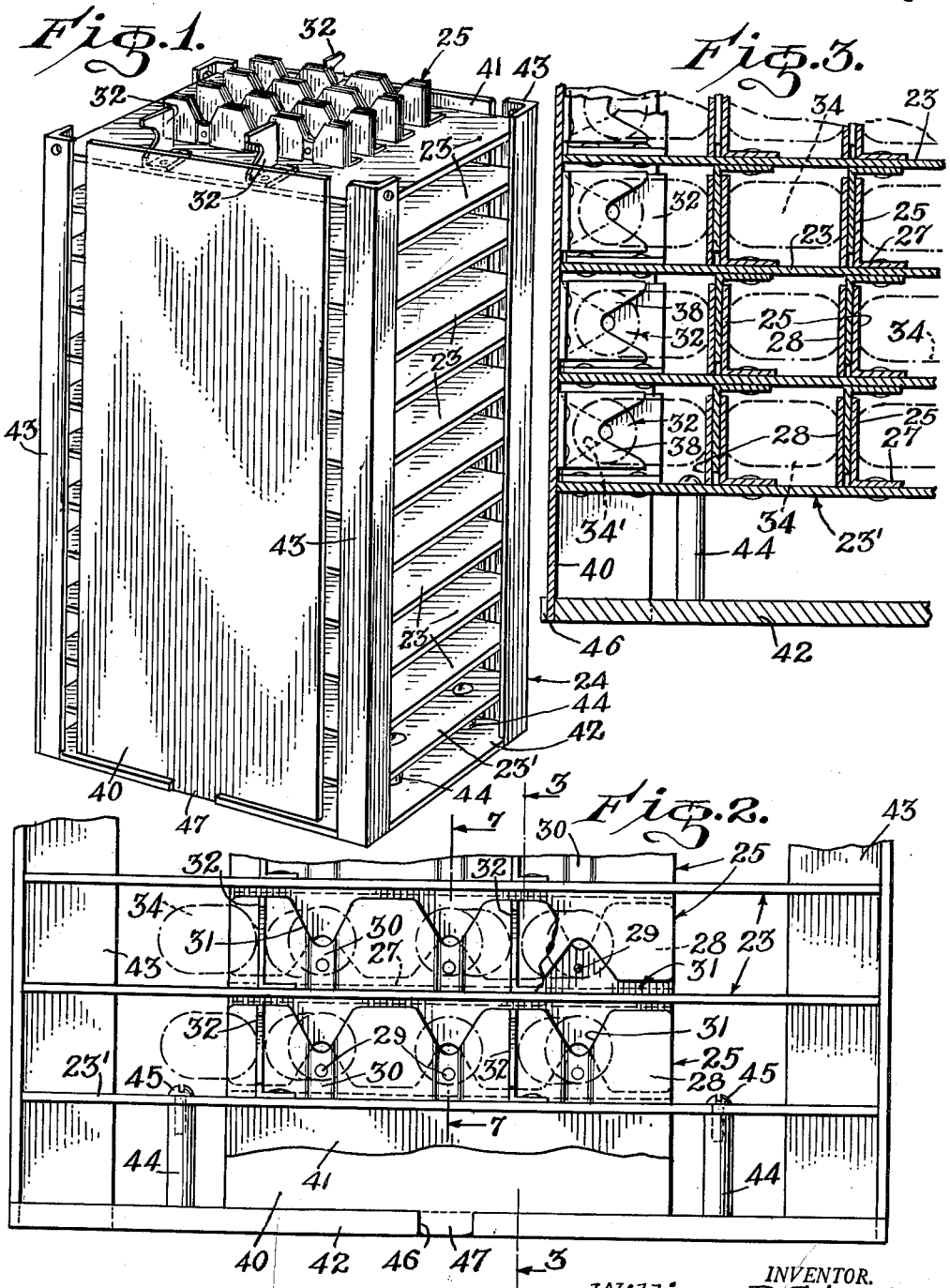

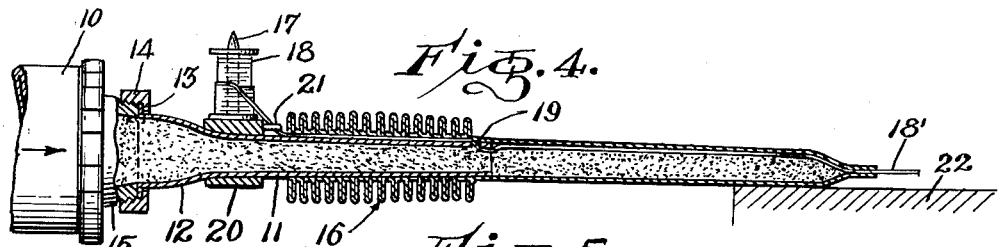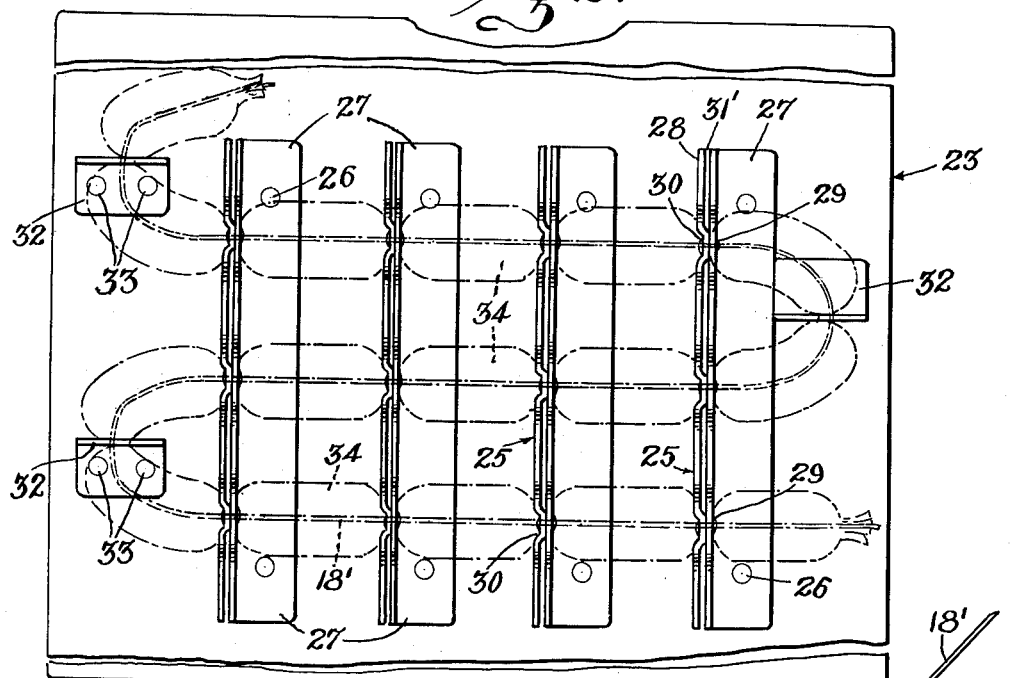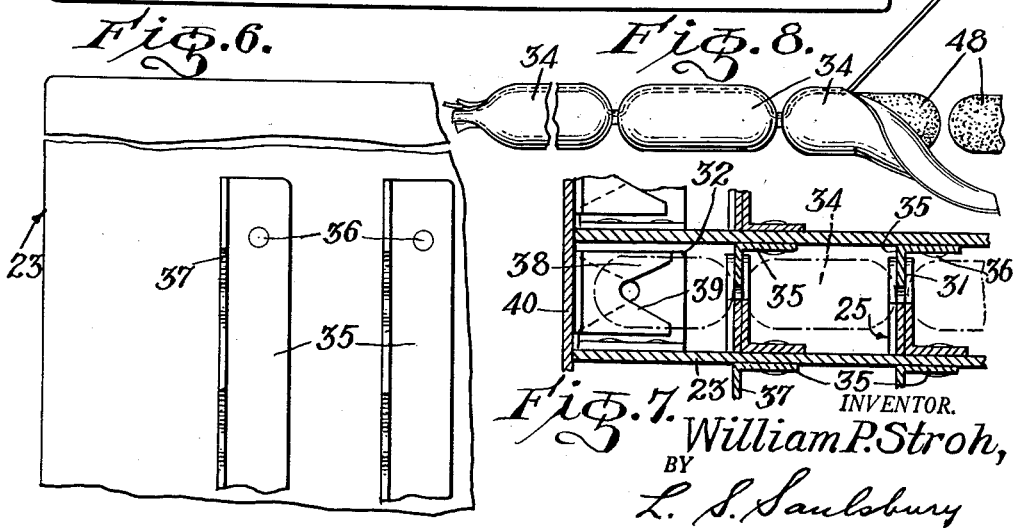

2,980,949
APPARATUS FOR MAKING SKINLESS COCKTAIL SAUSAGES

William P. Stroh, 28—25 34th St., Long Island City, N.Y.

Original application Feb. 18, 1954, Ser. No. 411,089. Divided and this application June 6, 1957, Ser. No. 668,009

3 Claims. (Cl. 17—34)

This application is a division of co-pending application, Serial No. 411,089, filed February 18, 1954, now abandoned.

This invention relates to the process of and apparatus for making skinless cocktail sausages and frankfurters.

It is an object of the present invention to provide a process of and apparatus for making cocktail sausages and frankfurters in mass production that eliminates the string tying operations that accompany the present process of forming sausages and frankfurters and to make possible the making of cocktail sausages which are skinless with little expense and of less cost than required for producing the present cocktail sausages and frankfurters that are served with the skins on them.

It is another object of the invention to provide a skinless meat or fish cocktail sausage which is firm and has the shape of the present cocktail sausage, or frankfurters that have skins on them.

It is another object of the invention to provide a process of and apparatus for making cocktail sausages and frankfurters that requires less handling than what is ordinarily required with the present large size skinless frankfurters and thereby to make possible the making of small size cocktail sausages and frankfurters on a profitable basis and devoid of great handling.

It is another object of the invention to provide a stuffing tube arrangement wherein the hole in the stuffing tube is located at the end of the tube so that the thread is kept at the top of the mixture as it is extruded from the tube with the casing whereby when the string is used to skin the sausage after cooking, there will be little showing of any visible mark as where the string is not kept and retained close to the inner surface of the casing as the casings then are being stuffed with the sausage meat and wherein the string can be pulled throughout the length of a large quantity of sausages to remove the skin, the tying of the individual sausages having been eliminated and the string being used to sever the full extent of a string or chain of sausages instead of individually.

For other objects and a better understanding of the invention reference may be had to the following detailed description taken in connection with the accompanying drawing, in which:

Figure 1 is a perspective view of the apparatus which contains the chain of sausages while they are being cooked;

Fig. 2 is an enlarged fragmentary elevational view of one side of the forming and cooking apparatus with the plate being broken away to show the manner in which the sausage links are shaped and retained during the cooking operation;

Fig. 3 is a fragmentary vertical sectional view taken on line 3—3 of Fig. 2;

Fig. 4 is a longitudinal sectional view of the stuffing tube with a casing disposed thereon and with the casing and thread being extended with the meat as it is forced from the tube;

Fig. 5 is a top plan view of one of the sausage supporting plates of the cooking apparatus;

Fig. 6 is a fragmentary bottom plan view of the plate shown in Fig. 5;

Fig. 7 is a fragmentary vertical sectional view taken on line 7—7 of Fig. 2 with the rivets omitted and showing the end retaining members;

Fig. 8 is a fragmentary view of a chain of cocktail sausages after the cooking of the same has been effected with the skins and with illustration made of the manner in which the casing is severed by pulling the string and to free the individual skinless sausages.

Referring now to the figures, the present process and the apparatus for carrying out this process will now be described. The sausage meat is prepared and placed in the stuffing machine indicated at 10 from which extends a stuffing tube 11. This stuffing tube has an enlarged inlet end 12 with a flange 13. A retaining nut 14 secures the tube rigidly upon the threaded end 15 of the machine 10. A plastic casing 16 will have been placed on the tube and prepared to receive the sausage meat.

Upon the tube 11 there is mounted a pin 17 that retains a spool 18 of nylon thread. This thread is disposed under the casing 16 and lead inwardly through a hole 19 at the forward end of the tube 11. The pin 17 can be held upon the tube in any desired manner but preferably by clip projections 20 so that the pin 17 can be readily removed from the tube. The pin structure has a loop 21 for guiding the thread as it is extended from the spool 18. This thread is indicated at 18'. By having the thread enter the casing with the meat as it is extruded from the very end of the tube, the thread is less apt to become embedded in the center of the meat and is more readily held against the inner wall surface of the plastic casing.

The casing with the meat is extended over the flat surface 22 and the usual tying of the casing to form the respective sausage links is dispensed with. This casing may be thirty feet in length and needs only to be tied at its ends. The end of the string is tied to the casing and the force of the ground stuffing mixture pushes the string against the wall of the casing and carries the string along with the casing to the end thereof. The string or thread can then be severed and tied to the rear end of the casing. If the string or thread 18' had been led into the mixture through a hole rearwardly of the end of the tube 11, it would become embedded in the stuffing mixture and thus make it difficult to find when separating the casing and also it would destroy the sausage when removing the casing.

The long casings with the meat in them are then taken from the surface 22 and placed on carriers 23 forming a part of the cooking apparatus indicated generally at 24. As illustrated in Fig. 5, the casings are placed upon bracket supports 25 laterally spaced across the surface of the carrier 23 and secured thereto by rivets 26. These brackets 25 consist of an angle member 27 and a plate member 28 secured to the vertical portion of the angle member 27 by rivets 29, Fig. 5. The plate 28 is vertically indented as indicated at 30 to provide a small space 31' between the plates. The rivets 29 extend into the indented portions 30 of the plate 28. Above each rivet 29, both the plate 28 and the vertical portion of the angle member 27 are notched to provide a narrow bottom end by which the casing and the sausage meat are shaped by the drawing of the casing into a narrowed opening at the bottom of the notch and to thereby form and shape the ends of the sausage meat within the casing. These notches are indicated at 31.

The casings with the stuffing meat are strung through the notches and in a serpentine manner upon the carrier 23 as best shown in Fig. 5. At the ends of the carrier are upstanding or end depending brackets 32 secured to the carrier plate by rivets 33 and which are also notched as indicated at 34' to receive the casing and to shape the ends of the individual sausage elements. The casings will accordingly be retained in such a manner as to form a series of cooking containers for the sausage meat as indicated at 34.

To further shape the cooking containers 34, the carrier 23 which is superimposed upon the one carrier has depending notched brackets 35 secured to the bottom face of the carrier plates by rivets 36. These brackets 35 are notched as indicated at 37 and will accommodate the reduced casing material to further form the ends of the sausage meat by the containers 34 as the brackets 35 are inserted into the space 31 between the angle member 27 and the plate 28.

The brackets 32 which secure the end turns of the casings as they are placed on the carrier plate receive double plate brackets 38 having notches 39 for receiving and forming the casing at the end turns of the casing. These double plate brackets 38 are secured to vertically extending plates 40 and 41. These brackets are vertically spaced upon the carriers and are adapted to be aligned with the different end brackets 32 of the carriers as they are stacked into the forming and cooking apparatus 24. This apparatus 24 further includes a bottom base plate 42 of the same shape and size as the carrier and upwardly from the corners of which extend angle vertical guides 43 that facilitate the fitting together of the carriers and which causes the brackets of the respective carriers to be aligned with one another to properly receive and shape the sausage containers 34 of the casing.

The bottom carrier 23' is provided with four supporting rods 44 secured thereto by screws 45 Figs. 2 and 3. The base 42 is recessed as indicated at 46 to receive a depending projection 47 on the plate 40 or 41 that will cause the brackets of the plate 40 or 41 to be properly aligned with the end brackets of the carrier when the plate 40 or 41 is secured to the assembly. The friction of the brackets with one another upon these plates is adequate to secure the plates in place on the assembly.

With the carriers 23 assembled in the guides 43 and the plates 40 and 41 in place, the assembly can be placed in a cooking vessel and the sausage meat or fish cooked in the individual containers to assume the sausage shape and to become sufficiently hard so that the casing can be removed. After the cooking operation has been completed, the carriers are removed from the guides 43 and the chain of sausage links is removed from the carrier. By pulling on the thread or string 18' from one end, the casing containers throughout the entire length of the strip will be severed and skinless cocktail sausages 48 will have been formed. The sausage mixture having been cooked the sausages are ready to be served.

It should thus be apparent that there has been provided a process of forming cocktail sausages in a mass manner and without the need for tying the individual sausage containers and without the sausages being destroyed upon the string being pulled as where the string is initially improperly assembled within the casing.

It will also be apparent that there has been provided a quick method of preparing cocktail sausages. It will will also be seen that the containers can be easily removed from the sausage meat quickly and in great quantities thereby cutting the production costs considerably and eliminating the cost of tying and the purchase of expensive skinning machines such as are used with the long sausages and frankfurters. A simple an inexpensive skinning step has been introduced in this process that makes possible the production of skinless cocktail sausages in mass quantities. It is also seen that when the casings are removed from the sausage meat that the thread or string having been held against the inner wall of the sausage casing will have caused little showing of any visible mark upon the sausage.

While various changes may be made in the detail construction, it shall be understood that such changes shall be within the spirit and scope of the present invention as defined by the appended claims.

What is claimed is:

1. An apparatus for forming sausages comprising a base, laterally spaced vertical guide members extending upwardly from the base, sausage carrier plates adapted to be stacked one upon the other and upon said base and guided when being placed upon one another by said vertically extending guide members and each having end depending brackets, each of said carrier plates having laterally spaced brackets with narrowing notches adapted to form and support a casing having sausage material to provide container portions between the brackets, end brackets disposed respectively at the opposite ends of the plate to receive the casing upon the same being curved and distributed upon the notches of the first mentioned brackets, said latter brackets being similarly provided with narrowing notches, said first mentioned brackets being formed of spaced plates, the end depending brackets upon said carrier plate having a narrowing notch and adapted to extend into the space between the plates of the first mentioned brackets whereby to further confine the casing and to shape the container portions, the first mentioned brackets of the one carrier plate cooperating with the depending brackets of the superimposed carrier plate, and vertically extending end plates having inwardly extending brackets with narrowing notches cooperating with the end brackets of the respective carrier plates to form the end turns of the casing.

2. An apparatus for forming cocktail sausages as defined in claim 1 and said verticlly extending plates having respectively depending guide projections, said base having a recess adapted to receive the guide projections whereby said plates may be properly aligned so that the brackets thereof will be aligned with the end brackets of the carrier plates.

3. An apparatus for forming sausage sections from an elongated casing filled with sausage mixture comprising a carrier plate having upstanding laterally spaced brackets thereon, said brackets having narrowing notches for shaping the ends of the sections upon the casing being disposed upon the brackets, a second carrier plate adapted to be fitted over the first carrier plate and having depending brackets with inverted narrowing notches which cooperate with the notches of brackets of the first carrier to finally form and reduce the casing to provide sausage containers, the brackets on one of the carrier plates formed of two members, one of which members being indented at the location of the notches and secured to the other member whereby to provide spaces at the opposite sides of the indentation to receive the sides of the notch of the other bracket, end brackets having laterally extending narrowing notches over which the casing can be turned outwardly of the brackets and said brackets respectively having a plurality of narrowing notches laterally spaced so that the casing can be arranged in a serpentine manner over the bracket notches and the end notches upon the carrier, and an end plate having inwardly extending brackets with narrowing notches adapted to cooperate with the end brackets on the carrier plate to further confine and form the reduced portions of the casing and the ends of the sausages containers.

References Cited in the file of this patent

UNITED STATES PATENTS

| Number | Name | Date |
| --- | --- | --- |
| 1,718,896 | Dietrich | June 25, 1929 |
| 2,052,092 | Hillery | Aug. 25, 1936 |
| 2,054,875 | Corey | Sept. 22, 1936 |
| 2,138,260 | Trabold | Nov. 29, 1938 |
| 2,169,413 | Freeman | Aug. 15, 1939 |
| 2,225,694 | Freeman | Dec. 24, 1940 |
| 2,685,770 | Conti | Aug. 10, 1954 |